Patented Dec. 14, 1948

2,456,454

UNITED STATES PATENT OFFICE 2,456,454

BUTADIENE-ACRYLONITRILE COPOLYMER MIXED WITH VINYLIDENE CHLORIDE-ACRYLONITRILE COPOLYMER

Ralph J. Signer, Chicago, Ill., assignor to The Visking Corporation, Chicago, Ill., a corporation of Virginia No Drawing. Application January 17, 1946, Serial No. 641,875

16 Claims. (Cl. 260—45.5)

This invention relates to resinous compositions, and more particularly to new and improved resinous compositions for the production of films as well as the films produced therefrom.

A film, to be suited for wrapping cheese, must be capable of protecting the material from the gases of the atmosphere which lead to spoilage or drying. It must have a high resistance to the transmission of oxygen, to prevent oxidative rancidity and spoilage, as well as high resistance to moisture vapor, to prevent drying and undue hardening, since the reactions occasioned by oxidative rancidity and drying produce objectionable changes in flavor. For a film to be considered practical for wrapping, for example, Cheddar cheese in block form, the limit of its moisture vapor transmission is 0.3 to 0.4 gram of water per 100 square inches per 24 hours at 25° C. and 85% relative humidity, and the oxygen transmission may be as high as 50 cc. per 100 square inches per 24 hours at 25° C.

In addition to the foregoing, the physical properties of the film should be such that snugness of fit can be obtained. For this effect, a resilient type of film is desired so that there will be no cracking at the corners. Other properties which are to obvious advantage are high tensile strength, a fair amount of elongation (100%–400%), transparency, printability, easy separation of film layers, absence of substances that will migrate from the film into the cheese, resistance to exudation of fatty substances, and resistance to puncture. Further desirable qualities are a certain amount of return after stretching, resistance of the film to imparting foreign odors to the cheese, and absence of odor of the film itself or the presence of film odor that is not absorbed by the cheese.

All available single and unlaminated or uncoated films have been tried as cheese and similar food wrappers and have been found, because of serious defects, to be unsatisfactory. Some of the films available in the market have the necessary qualities for protecting the material packaged or wrapped therein from the gases of the atmosphere but lack the other desirable characteristics, such as resiliency, snugness of fit to the packaged material, absence of cracking at corners, and heat sealability. Other of the available films have one or more of the desirable physical characteristics but lack the ability to prevent spoilage and dryness.

For economic reasons, it is also highly desirable that the film be produced in continuous length and thereafter cut to the desired sizes. One of the desirable methods of producing resinous films comprises extruding a solution of the resin in a coagulating bath which is miscible with the solvent of the solution but in which the resin is insoluble whereby the extruded material is precipitated. The wet extruded material is then washed and finally dried. In the foregoing procedure, the film is conducted in a sinuous course over and under conveyer and guide rolls in and through the precipitating and the washing baths, and also engages and contacts with rolls during the drying operations.

During the course of research, attempts were made to produce films of butadiene-acrylonitrile copolymer (containing 45% acrylonitrile) by extruding a solution of this copolymer in an appropriate solvent mixture by the previously described method. Not only was this solution unstable and soon formed gel properties, but the solution could not be used in the continuous formation of film by extruding in a coagulating bath, as above described, because whenever the film folded on itself or passed over rolls it would stick together and, being soft and stretchy, could not be conducted through the washing and drying stages.

Also, in the course of the research, a dispersion was made of vinylidene chloride-acrylonitrile copolymer (containing 75% vinylidene chloride) and attempts were made to produce film therefrom by the process hereinbefore described. When such a dispersion was extruded into a water bath, the resulting film was extremely tacky and unmanageable and the process could not be operated in a continuous manner because, whenever the film folded on itself or passed over rolls, it would stick together and, being soft and stretchy, could not be conducted through the washing and drying stages.

An object of this invention is to provide a new and improved resinous composition.

Another object of this invention is to provide a resinous composition which can be processed into film of continuous lengths.

An additional object of this invention is to provide a resinous composition which will produce films highly resistant to the transmission of oxygen and water vapor.

A further object of this invention is to provide a resinous composition which will produce films characterized by stretchability and return.

A still further object of this invention is to provide a resinous composition which will produce films suitable for wrapping or packaging of cheese and other materials.

A still further object of this invention is to produce a new and improved film.

A still further object of this invention is to provide a resinous film which inter alia is suitable as a wrapper for cheese.

Other and additional objects will become apparent hereinafter.

The objects of this invention are accomplished, in general, by a film-forming composition in which the film-forming ingredients consist essentially of a homogeneous mixture of vinylidene chloride-acrylonitrile copolymer and butadiene-acrylonitrile copolymer, and which is obtained by dissolving the two copolymer resins in a common solvent or solvent mixture. The film-forming composition consists of a dope or dispersion which is characterized by greatly improved extruding qualities and ease of handling. In one embodiment, the dispersion is extruded in the form of a film into a coagulating bath, which is volatile at the drying temperature and miscible with the solvent or solvent mixture but in which the resinous mixture is insoluble, whereby the film is coagulated. The coagulated film is then washed and dried.

The film in coagulation develops sufficient character so that it can be conducted in a sinuous passage through the wash baths by passage over and under appropriately positioned guide and conveyer rolls. Furthermore, the coagulated film can fold on itself without being incapable of straightening later in the washing or drying operations.

The film is dried by exposure to temperatures of 50° C. to 100° C. whereby any residual solvent and adhering liquids are removed. The composition is admirably suited for producing seamless tubing by the method aforementioned. In such process, the composition is extruded through an annular nozzle of the type disclosed in U. S. Patent 1,601,686 into a coagulating bath and, after passing through the coagulating bath, is fed through wash baths. After washing, the tubing is dried. A suitable apparatus for coagulating and washing the seamless tubing is disclosed in U. S. Patent 1,937,225. The drying can be effected by the process and apparatus disclosed in U. S. Patent 1,967,773. The composition is also suitable for producing film by the dry method wherein the solvent is evaporated.

In another embodiment, the dope can be formed into the desired shape and coagulated by evaporation of the solvent.

The details and manner of practicing the invention will become apparent by reference to the following specific examples, it being understood that these examples are merely illustrative embodiments of the invention and that the scope of the invention is not limited or restricted thereto. Throughout the examples, the proportions of the ingredients are by weight.

EXAMPLE 1

| | Parts |
|---|---|
| Butadine-acrylonitrile copolymer (40%–45% acrylonitrile) | 4.5 |
| Vinylidene chloride-acrylonitrile copolymer (75% vinylidene chloride) | 4.5 |
| Methyl ethyl ketone | 45.0 |
| Dioxane | 45.0 |

EXAMPLE 2

| | Parts |
|---|---|
| Butadiene-acrylonitrile copolymer (45% acrylonitrile) | 2.4 |
| Vinylidene chloride-acrylonitrile coplymer (75% vinylidene chloride) | 9.6 |
| Methyl ethyl ketone | 45.0 |
| Dioxane | 45.0 |

EXAMPLE 3

| | Parts |
|---|---|
| Butadiene-acrylonitrile copolymer (45% acrylontrile) | 60.0 |
| Vinylidene chloride-acrylonitrile copolymer (75% vinylidene chloride) | 100.0 |
| Stearamide | 2.90 |
| Dicetyl ether | 2.90 |
| Acetone | 733.0 |
| Dioxane | 183.0 |
| Propylene oxide (to prevent resin decomposition) | 30.0 |

The stearamide and dicetyl ether can be replaced by 1 part of either cetyl acetamide or ethylene bis palmitylamide.

EXAMPLE 4

| | Parts |
|---|---|
| Butadiene-acrylonitrile copolymer (45% acrylonitrile) | 2.4 |
| Vinylidene chloride-acrylonitrile copolymer (75% vinylidene chloride) | 9.6 |
| Methyl ethyl ketone | 90.0 |

EXAMPLE 5

| | Parts |
|---|---|
| Butadiene-acrylonitrile copolymer (35% acrylonitrile) | 2.4 |
| Vinylidene chloride-acrylonitrile copolymer (75% vinylidene chloride) | 9.6 |
| Cyclohexanone | 90.0 |

Each of the compositions disclosed in the examples was prepared by soaking the butadiene-acrylonitrile copolymer in the solvent or solvent mixture until swelling was complete. The mass was then rapidly stirred and the temperature was gradually raised to about 75° C. Stirring was continued until solution was complete, at which time the vinylidene chloride-acrylonitrile copolymer was added to the solution, and stirring was continued at the same temperature until a homogeneous smooth dispersion was obtained.

Alternatively, the vinylidene chloride-acrylonitrile copolymer can be added to the swollen butadiene-acrylonitrile copolymer and the mass then rapidly stirred in a closed system while gradually increasing the temperature to about 100° C., the stirring being continued until a substantially homogeneous smooth dispersion is obtained.

In each of the example, the dispersion was stable and was characterized by greatly improved extruding qualities and ease of handling. When the composition of Example 3 was extruded in the form of film into water, the film was coagulated and the coagulated film was of a type and nature so that it could be folded on itself and subsequently separated during the washing or drying operations whereby the coagulated film could be conducted through the washing baths and drier by appropriately positioned conveyor rolls and guide rolls.

Illustrative properties of films produced from

Examples 1 and 2 respectively are set forth in the following table:

Table I

|  | Film produced from composition of— | |
|---|---|---|
|  | Example 1 | Example 2 |
| Tensile strength (lbs. per sq. in.) | 12,000.00–10,500.00 | 15,065.00 |
| Elongation at break (in per cent) |  | 320.00 | 370.00 |
| Oxygen transmission (cc. per 24 hrs. per 100 sq. in.) [1] | 34.8 | 5.4 |
| Moisture vapor transmission (grs. per 100 sq. in. per 24 hrs. at 85% relative humidity and 25° C.) [2] | 0.092 | 0.2 |
| Thickness (mils) | 1.76 | 2.0 |
| Tear value (Thwing Albert) (grs. per mil thickness) |  | 160.0 |

[1] Oxygen transmission was determined by the method and apparatus described in Paper Trade Journal, vol. 118, No. 10, page 32.
[2] Moisture vapor transmission was determined by the method described by Doty, Aiken and Mark in the Analytical Edition, Industrial and Engineering Chemistry, vol. 16, page 686.

The films were obtained by spreading the respective dope on a glass plate, dried at 50° C.–60° C. for 1 hour, and then baked in an oven at 80° C. for several hours, after which the film was stripped from the plate.

The film resulting from each of the compositions of the specific examples was transparent and unvulcanized. It is, however, to be understood that the invention is not restricted thereto and that the film can be vulcanized. Any of the plasticizers, softeners, fillers, reinforcing pigments, age-resistors, accelerators and vulcanizing ingredients which are ordinarily used in the compound of rubber or synthetic rubber may be incorporated in the film-forming composition. When such a composition is used, the film, after or during drying, is vulcanized in the known manner.

In the preferred embodiment of the invention, substances which aid to eliminate the tendency to adhesion are incorporated into the composition. Stearamide, dicetyl ether, cetyl acetamide and ethylene bis palmitylamide are illustrative examples of such substances.

The resistance to moisture vapor transmission of the film can also be increased by the inclusion in the composition of appropriate substances, such as waxes and the like.

If desired, plasticizers and coloring agents may also be included in the dopes.

In general, the butadiene-acrylonitrile copolymer is obtained by copolymerizing a mixture of the respective monomers in which the acrylonitrile constitutes from about 25% to about 60%, by weight, of the total amount of monomers. As shown by the examples, the preferred butadiene-acrylonitrile copolymer was formed by copolymerizing a mixture of the monomers in which the acrylonitrile was present in an amount consisting of 35%–45%, by weight, of the total quantity of the monomers.

The vinylidene chloride-acrylonitrile copolymer which is employed in this invention is that which is obtained by copolymerizing a mixture of vinylidene chloride and acrylonitrile monomers and in which mixture the vinylidene chloride monomer is the predominant constituent. In the preferred form, the vinylidene chloride-acrylonitrile copolymer is that which is obtained by copolymerizing a mixture of vinylidene chloride and acrylonitrile and in which mixture the vinylidene chloride constitutes 75%, by weight, of the total amount of monomers.

The composition can contain mixtures of the vinylidene chloride-acrylonitrile copolymer and butadiene-acrylonitrile copolymer over the complete range of compositions. For example, compositions can be obtained from 99 parts of vinylidene chloride-acrylonitrile copolymer and 1 part of butadiene-acrylonitrile copolymer to 1 part of the first copolymer and 99 parts of the second copolymer. For unvulcanized films, the percentage of butadiene-acrylonitrile copolymer constitutes from 5% to 60%, by weight, of the total amount of copolymers in the composition. Preferably, the composition for producing unvulcanized films contains butadiene-acrylonitrile copolymer in an amount of from 15% to 50%, by weight, of the total quantity of the copolymers, but a lower proportion thereof, such as 5% to 10%, may be desirable depending on the mode of packaging. For compositions which are to produce vulcanized films, the butadiene-acrylonitrile copolymer can be present in excess of 60%, by weight, of the total quantity of the copolymers.

The solvents which are employed in the production of the dopes are not restricted to those set forth in the specific examples. When the film is to be produced by a dry method, i. e. casting on a suitable support, such as a glass plate or the like, and subsequently evaporating the solvent, any volatile solvent or solvent mixture in which both of the ingredients are soluble can be used. Methyl ethyl ketone, cyclohexanone, mesityl oxide, dioxalane, etc. are illustrative examples of solvents which can be used for the process of film formation by evaporation of solvent.

As illustrative examples of solvent mixtures which can be used for the process of film formation by evaporation are the following:

|  | Parts |
|---|---|
| (1) Methyl ethyl ketone | 45 |
| Dioxane | 45 |
| (2) Methyl ethyl ketone | 45 |
| Toluene | 45 |
| (3) Methyl ethyl ketone | 67.5 |
| Toluene | 22.5 |

When the composition is to be extruded by the wet process, i. e. into a coagulating bath, the solvent or solvent mixture employed in the composition is one which is preferably miscible with the coagulating bath and volatile so that any residual solvent that remains in the product will be removed on drying.

The aforementioned solvents and solvent mixtures can be used in processes wherein there is used a coagulating bath, such as alcohol, hexane and other liquids, having the properties previously mentioned.

Dioxolane, dioxane and mixtures of acetone and dioxane are illustrative examples of solvents and solvent mixtures which can be used in a process wherein coagulation is effected by water. The solvent mixture set forth in Example 3 is the preferred solvent mixture for use in a process wherein coagulation is effected by water. In general, when coagulation is to be effected by water and the dioxane and acetone constitute the solvent mixture, the dioxane should be present in an amount of at least about 20% (by weight) of the solvent mixture.

In the preferred embodiment, the concentration of the total quantity of copolymers in the dope is from 10% to 12%, by weight, but it is to be understood that the invention is not restricted to such concentrations and that, in general, the concentration of the total quantity of copolymers in the dope can be greater or less depending on the desired thickness of film, rate of extrusion and the like.

The resinous compositions of this invention are not restricted to producing self-sustaining films by a dry casting method. Self-sustaining films can be obtained by the wet extrusion method wherein the dope is extruded into a coagulating bath which is miscible with the solvent or solvent mixture of the dope and in which the copolymers are insoluble. In such wet extrusion procedure, the coagulated film is subsequently washed and dried to remove any residual solvents and adhering bath liquors, as hereinbefore described.

The wet extrusion method is particularly suitable for the production of continuous seamless tubing. As previously explained herein, in such procedure the dope is extruded through an annular nozzle into water (coagulating bath).

In general, the thickness of the self-sustaining films, such as continuous sheeting or seamless tubing, is from 1 to 4 mils, and preferably 1.5 mils.

Self-sustaining films in the form of continuous sheeting, and preferably seamless tubing produced in accordance with this invention, are characterized by high resistance to oxygen and moisture vapor transmission in combination with stretchability and return. Up to the present invention, no film containing this combination of properties was available. Because of these properties, the films, either in the form of continuous sheeting and preferably seamless tubing, is admirably suitable for use in wrapping and packaging of all varieties of natural Cheddar cheese and can be used for packaging of any hard or semi-hard natural cheese, such as Swiss, brick and Munster cheeses.

In addition to the foregoing properties, the film is transparent, thermoplastic, heat-sealable, resilient, has a high tensile strength, has a fair amount of elongation, is printable, contains no substances which will affect the odor and taste of the cheese or will migrate from the film into the cheese, resists exudation of fatty substances, and is highly resistant to puncture, all of which properties render the material particularly suitable for packaging of cheese of the types previously mentioned.

Though the invention has been described with particular reference to wrapping and packaging of cheese, the film is also capable of other uses. It can be used for the packaging of any product where oxidative rancidity and drying are factors in the deterioration of the product. It can be used for the confining of gases, such as in balloons, etc., as well as for containers for fluids and semi-fluid materials which are chemically inert with respect to the film.

The dopes have been specifically described in connection with the production of self-sustaining films, preferably in the form of seamless tubing. The invention, however, is not restricted thereto. The dope of this invention can be used in the production of other shaped artificial structures, such as filaments, yarns, caps, bands, etc., by the wet extrusion or dry casting methods hereinbefore described. Likewise, the dopes can be employed as a coating composition for coating of various base materials, such as paper, fabric, metal foil, regenerated cellulose, polyvinyl alcohol, nylon, zein, ethyl cellulose, cellulose acetate, etc. Additionally, the composition can be used as a sealing cement for gas-proof seals of resinous sheet materials, as a gasket cement, etc.

The properties possessed by the films of this invention are not the additive properties of the two copolymers. Whereas, as previously explained hereinbefore, dopes consisting of each of the copolymers alone could not be extruded by the wet process, a dope containing both of the copolymers, as herein described, can be extruded by such process. Additionally, a film produced from a dope containing both of the copolymers, as herein described, is characterized by new and unobvious properties which are indeed remarkable. This becomes apparent from the following table:

Table II

|  | A[1] | B[1] | C[1] | D[1] |
|---|---|---|---|---|
| Thickness (in mils) | 3.8 | 2.0 | 2.0 | 2.0 |
| Tensile Strength (final cross-section) (per sq. in.) | 8,952 | 7,485 | 7,778 | 15,065 |
| Elongation (in per cent) | 1,073 | 21 | 278 | 370 |
| Tear Value [2] | 126 | 23 | 44.5 | 160 |
| Moisture Transmission (in grs. per 100 sq. in. for 24 hrs. at 85% relative humidity) [2] | 1.65 | 0 | 0.44 | 0.20 |
| Oxygen Transmission (in cc. per 100 sq. in. for 24 hrs.) [2] | Too soft and stretchy for testing. | (at 60 mm.) 0.318 |  | 5.4 |

[1] A is film formed of butadiene-acrylonitrile copolymer (45% acrylonitrile); B is film formed of vinylidene chloride-acrylonitrile copolymer (75% vinylidene chloride); C is calculated values of film containing 1 part butadiene-acrylonitrile copolymer (45% acrylonitrile) and 4 parts vinylidene chloride-acrylonitrile copolymer (75% vinylidene chloride); D is film formed of 1 part butadiene-acrylonitrile copolymer (45% acrylonitrile) and 4 parts vinylidene chloride-acrylonitrile copolymer (75% vinylidene chloride).
[2] Determined as in Table I.

The present invention provides a composition containing two copolymers and which can be processed by a wet extrusion process to produce shaped artificial structures, and particularly self-sustaining films, either in the form of continuous sheeting or preferably continuous seamless tubing consisting essentially of a physical homogeneous mixture of the two copolymers. A film, such as continuous sheeting or in the form of seamless tubing, consisting essentially of the physical mixture of the two copolymers, possesses a unique combination of properties, i. e. low oxygen and moisture vapor transmission with stretchability and return, which unique combination of properties though highly desired and sought for is not present in any film made prior to this invention. In addition to the unique combination of properties aforementioned, the film is also characterized by many other desirable properties whereby the film is particularly suitable for the wrapping and packaging of products which have to be protected from either oxidative reactions or drying reactions, or both reactions, and particularly for the wrapping and packaging of cheese of the types hereinbefore mentioned.

Herein, the expression "consisting essentially of" is intended to define the named ingredients with or without any modifying ingredients as herein described.

Herein, also, the term "dope" is intended to cover a solution or dispersion, and the term "solvent" is intended to cover a common solvent or a mixture of solvents for the copolymer in the dope.

Since it is obvious that various changes and modifications may be made in the above description without departing from the nature or spirit thereof, this invention is not restricted thereto except as set forth in the appended claims.

I claim:

1. A composition consisting essentially of a volatile solvent and a mixture of (a) butadiene-acrylonitrile copolymer in which the acrylonitrile content is between 25% and 60% and (b) vinylidene chloride-acrylonitrile copolymer in which the vinylidene chloride is the predominant constituent.

2. A composition consisting essentially of a volatile solvent and a mixture of (a) butadiene-acrylonitrile copolymer in which the acrylonitrile content is between 25% and 60% and (b) vinylidene-acrylonitrile copolymer in which the vinylidene chloride is the predominant constituent, the quantity of said butadiene-acrylonitrile copolymer constituting from 5% to 60% by weight of the total quantity of said copolymers.

3. A composition consisting essentially of a volatile solvent and a mixture of (a) butadiene-acrylonitrile copolymer in which the acrylonitrile content is between 25% and 60% and (b) vinylidene chloride-acrylonitrile copolymer in which the vinylidene chloride content is 75%.

4. A composition consisting essentially of a volatile solvent and a mixture of (a) butadiene-acrylonitrile copolymer in which the acrylonitrile content is between 25% and 60% and (b) vinylidene chloride-acrylonitrile copolymer in which the vinylidene chloride content is 75%, the quantity of said butadiene-acrylonitrile copolymer constituting from 5% to 60% by weight of the total quantity of said copolymers.

5. A composition consisting essentially of a volatile solvent and a mixture of (a) butadiene-acrylonitrile copolymer in which the acrylonitrile content is between 35% and 45% and (b) vinylidene chloride-acrylonitrile copolymer in which the vinylidene chloride content is 75%.

6. A composition consisting essentially of a volatile solvent and a mixture of (a) butadiene-acrylonitrile copolymer in which the acrylonitrile content is between 35% and 45% and (b) vinylidene chloride-acrylonitrile copolymer in which the vinylidene chloride content is 75%, the quantity of said butadiene-acrylonitrile copolymer constituting from 5% to 60% by weight of the total quantity of said copolymers.

7. Shaped artificial structures consisting essentially of a mixture of (a) butadiene-acrylonitrile copolymer in which the acrylonitrile content is between 25% and 60% and (b) vinylidene chloride-acrylonitrile copolymer in which the vinylidene chloride is the predominant constituent.

8. Shaped artificial structures consisting essentially of a mixture of (a) butadiene-acrylonitrile copolymer in which the acrylonitrile content is between 25% and 60% and (b) vinylidene chloride-acrylonitrile copolymer in which the vinylidene chloride content is 75%.

9. A film consisting essentially of a mixture of (a) butadiene-acrylonitrile copolymer in which the acrylonitrile content is between 25% and 60% and (b) vinylidene chloride-acrylonitrile copolymer in which the vinylidene chloride is the predominant constituent.

10. A film consisting essentially of a mixture of (a) butadiene-acrylonitrile copolymer in which the acrylonitrile content is between 25% and 60% and (b) vinylidene chloride-acrylonitrile copolymer in which the vinylidene chloride is the predominant constituent, the quantity of said butadiene-acrylonitrile copolymer constituting from 5% to 60% by weight of the total quantity of said copolymers.

11. A film consisting essentially of a mixture of (a) butadiene-acrylonitrile copolymer in which the acrylonitrile content is between 25% and 60% and (b) vinylidene chloride-acrylonitrile copolymer in which the vinylidene chloride content is 75%.

12. A film consisting essentially of a mixture of (a) butadiene-acrylonitrile copolymer in which the acrylonitrile content is between 25% and 60% and (b) vinylidene chloride-acrylonitrile copolymer in which the vinylidene chloride content is 75%, the quantity of said butadiene-acrylonitrile copolymer constituting from 5% to 60% by weight of the total quantity of said copolymers.

13. A film consisting essentially of a mixture of (a) butadiene-acrylonitrile copolymer in which the acrylonitrile content is between 35% and 45% and (b) vinylidene chloride-acrylonitrile copolymer in which the vinylidene chloride content is 75%.

14. A film consisting essentially of a mixture of (a) butadiene-acrylonitrile copolymer in which the acrylonitrile content is between 35% and 45% and (b) vinylidene chloride-acrylonitrile copolymer in which the vinylidene chloride content is 75%, the quantity of said butadiene-acrylonitrile copolymer constituting from 5% to 60% by weight of the total quantity of said copolymers.

15. A method which comprises dissolving butadiene-acrylonitrile copolymer in which the acrylonitrile content is between 25% and 60% in a solvent, adding vinylidene chloride-acrylonitrile copolymer in which the vinylidene chloride is the predominant constituent to said solution, and agitating said mass until a smooth homogeneous mass is obtained.

16. A method which comprises dissolving butadiene-acrylonitrile copolymer in which the acrylonitrile content is between 25% and 60% in a solvent, adding vinylidene chloride-acrylonitrile copolymer in which the vinylidene chloride is the predominant constituent to said solution, and agitating said mass in the presence of heat, the temperature of which is below the boiling point of said solvent, until a smooth homogeneous mass is obtained.

RALPH J. SIGNER.

REFERENCES CITED

The following references are of record in the file of this patent:

UNITED STATES PATENTS

| Number | Name | Date |
|---|---|---|
| 2,238,020 | Hanson et al. | Apr. 8, 1941 |
| 2,323,562 | Nugent | July 6, 1943 |
| 2,330,353 | Henderson | Sept. 28, 1943 |
| 2,334,236 | Arnold et al. | Nov. 16, 1943 |